ical Office 3,025,291
Patented Mar. 13, 1962

3,025,291
N - HYDROXYALKYLPIPERIDINOALKYL - 2-CHLORO-10-PHENOTHIAZINECARBOXAMIDES AND PROCESS
Harman S. Lowrie, Northbrook, Ill., assignor to G. D. Searle & Co., Chicago, Ill., a corporation of Delaware
No Drawing. Filed Oct. 2, 1958, Ser. No. 764,755
7 Claims. (Cl. 260—243)

This invention relates to halogenated N-hydroxyalkyl-piperidinoalkyl-10-phenothiazinecarboxamides and a process for the manufacture thereof. More particularly, this invention relates to compounds of the formula

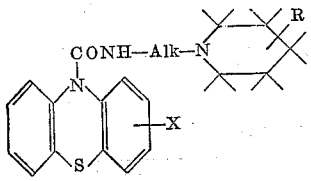

wherein Alk is an alkylene radical, R is a hydroxyalkyl radical, and X is halogen.

Among the alkylene radicals comprehended by Alk in the foregoing formula, especially lower alkylene radicals containing more than 1 carbon atom are preferred, namely, ethylene, propylene, trimethylene, 1,2-propylene, tetramethylene, 2,2-dimethyl-1,3-propylene, and like bivalent saturated acyclic straight- or branched-chain hydrocarbon groups of empirical formula

wherein $n$ is a small positive integer amounting to more than 1.

The substituted alkyl radicals designated by R in the above structural formula likewise are desirably of lower order, and may be thought of as derived by replacing, in an alkyl grouping comprising up to and including 8 carbon atoms, an opposite number of hydrogen atoms with at least 1 hydroxy radical. Illustrative of such hydroxy(lower alkyl) radicals are hydroxymethyl, 1-hydroxyethyl, 2-hydroxyethyl, 3-hydroxypropyl, 1-hydroxymethylethyl, 1,1-di(hydroxymethyl)propyl, 2,3-dihydroxypropyl, 3-hydroxybutyl, 5-hydroxypentyl, and the like. As will be apparent to those skilled in the art from the structural formula set forth, the point of attachment of R in the piperidine nucleus is unrestricted, alpha, beta, and gamma positioning alike being within the ambit of invention laid down.

With respect to the halogen, X, called for in the formula for compounds of this invention, a 2-chloro substituent has been found optimal, though other halogen otherwise attached will serve.

Equivalent to the basic amines of this invention for the purposes here described are non-toxic acid addition and quaternary ammonium salts thereof, the compositions of which may be symbolized by

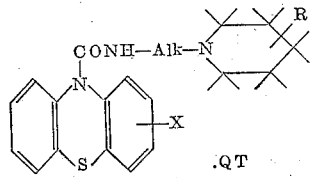

wherein Alk, R, and X have the meanings hereinbefore assigned, Q is selected from among hydrogen and lower alkyl, hydroxy(lower alkyl), and lower alkenyl radicals, as also such aralkyl radicals as benzyl, phenethyl, and naphthylmethyl; and T is one equivalent of an anion— for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in pharmaceutical dosage.

The compounds to which this invention relates are useful because of their valuable pharmacological properties. Especially, the subject compositions are distinguished by an exceptional inhibitory effect on the heat, swelling, redness, and granuloma formation characteristic of the inflammatory response to tissue injury.

The claimed products are obtained by contacting N-(2-chloroethyl)-2-chloro-10-phenothiazinecarboxamide for as long as several hours at elevated temperatures in an inert solvent with a piperidine of the formula

R being as previously defined. Suitable solvents are ethanol, butanone, toluene, dimethylformamide, and the like, a representative set of conditions for the contemplated manufacture being 12 or more hours at reflux temperatures in butanone medium. An acid acceptor such as potassium carbonate or a tertiary amine, and a catalyst such as sodium iodide, may be incorporated in the reaction mixture if desired.

Conversion of the amine bases hereof to corresponding acid addition salts is accomplished by simple admixture of these compounds with 1 equivalent of any of various inorganic and strong organic acids, the anionic portion of which conforms to T as hereinabove defined.

The quaternary ammonium compounds comprehended by this invention are those derived by contacting a claimed base with 1 equivalent of an organic ester of the formula

Q and T being limited by the meanings hereinbefore assigned, and it being additionally provided that Q is not hydrogen. Quaternization takes place in the temperature range between 25° and 100° centigrade, using an inert solvent such as chloroform, acetone, butanone, methanol, butanol, or the like as reaction medium. Quaternization is ordinarily completed in from 1 to 48 hours and is generally carried out in a closed system if a lower alkyl halide—such as methyl chloride—is one of the reagents. Using methyl bromide, the manufacture of quaternary salts may be smoothly effected in butanone solution at 70° centigrade, the reaction time being approximately 1 hour.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade, pressures in millimeters of mercury, and relative amounts of materials in parts by weight, except as otherwise noted.

EXAMPLE 1

(A) N - (2 - chloroethyl)-2-chloro-10-phenothiazine-carboxamide.—To 35 parts of ethyleneimine dissolved in 350 parts of anhydrous ether is added, with agitation under reflux, a solution of 85 parts of 2-chloro-10-chloroformylphenothiazine in 850 parts of anhydrous ether at a rate such that the heat of the resultant reaction is just sufficient to induce gentle boiling. When the addition is complete, agitation is maintained for 1 hour longer, whereupon the mixture is filtered. The filtrate is concentrated by boiling, then diluted with 250 parts of butanone, and finally boiled again to remove the last traces of ether. The solution thus obtained is cooled to 10° and thereupon diluted with 33 parts of hydrogen chloride dissolved in 130 parts of butanone. The powdery material which separates is filtered off after 16 hours and washed with butanone. This material is N-(2-chloroethyl)-2-chloro-10-phenothiazinecarboxamide, the melting point of which is 162–165°.

(B) *N - {2 - [4-(hydroxymethyl)piperidino]ethyl}-2-chloro-10-phenothiazinecarboxamide*.—A mixture of 17 parts of N-(2-chloroethyl)-2-chloro-10-phenothiazinecarboxamide, 15 parts of 4-(hydroxymethyl)piperidine, 2 parts of sodium iodide, 5 parts of triethylamine, and 320 parts of butanone is heated at the boiling point under reflux with agitation for 12 hours. The mixture is then filtered, following which solvent is removed by vacuum distillation and the residue taken up in benzene. The benzene solution is preliminarily washed with dilute aqueous potassium hydroxide, then with water, and is finally extracted with dilute hydrochloric acid. The acid extract, in turn, is washed with ether and then basified with dilute aqueous potassium hydroxide. The oil which precipitates is extracted with benzene, and the resultant solution repeatedly washed with water. Dried over anhydrous potassium carbonate, the benzene solution is finally stripped of solvent by heating to 90° under 0.5 mm. pressure. The brown glass which remains is the desired N - {2-[4-(hydroxymethyl)piperidino]ethyl}-2-chloro-10-phenothiazinecarboxamide of the formula

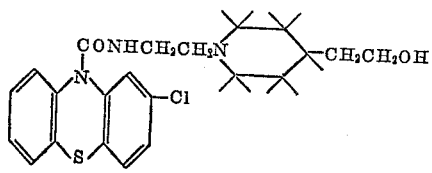

EXAMPLE 2

*N-{2-[4 - (2 - hydroxyethyl)piperidino]ethyl}-2-chloro-10-phenothiazinecarboxamide*.—A mixture of 68 parts of N - (2 - chloroethyl) - 2-chloro-10-phenothiazinecarboxamide, 88 parts of 4-(2-hydroxyethyl)piperidine, 7 parts of sodium iodide, and 1200 parts of butanone is heated at the boiling point under reflux with agitation for 20 hours. The mixture is then filtered, and the filtrate is stripped of solvent by evaporation in vacuo. The oil remaining is dissolved in approximately 2500 parts of benzene, and the benzene solution is successively washed with dilute aqueous potassium hydroxide and water. It is then extracted several times with dilute hydrochloric acid. The acid extracts are combined and washed with ether, then made strongly basic with dilute aqueous potassium hydroxide. The oil thrown down is extracted with benzene. This benzene extract is washed several times with water, dried over anhydrous potassium carbonate, and finally concentrated to a volume of approximately ⅔'s that of the butanone initially used as solvent. Upon addition of 400 parts of petroleum ether boiling in the range 77–115° and subsequent chilling, there is precipitated white prisms of N - {2-[4-(2-hydroxyethyl)piperidino]ethyl}-2-chloro-10 - phenothiazinecarboxamide. The product melts at 136–138° and has the formula

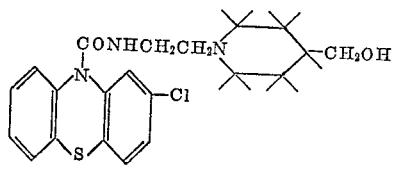

EXAMPLE 3

*N - {2-[4-(1-hydroxyethyl)piperidino]ethyl}-2-chloro-10-phenothiazinecarboxamide*.—A mixture of 130 parts of N - (2-chloroethyl)-2-chloro-10-phenothiazinecarboxamide, 80 parts of 4-(1-hydroxyethyl)piperidine, 35 parts of anhydrous potassium carbonate, 30 parts of sodium iodide, and 3200 parts of butanone is heated at the boiling point of the solvent under reflux for 12 hours, then filtered and stripped of solvent by vacuum distillation. The oily residue is taken up in benzene, and the benezne solution is consecutively washed with dilute aqueous potassium hydroxide and copious quantities of water. Solvent and residual moisture are removed by distillation, leaving N - {2-[4-(1-hydroxyethyl)piperidino]-ethyl}-2-chloro-10-phenothiazinecarboxamide, the formula of which is

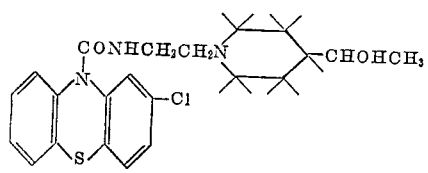

EXAMPLE 4

*N - {2 - [4 -( 3 - hydroxypropyl)piperidino]ethyl}-2-chloro-10-phenothiazinecarboxamide*.—A mixture of 17 parts of N-(2-chloroethyl)-2-chloro-10-phenothiazinecarboxamide, 10 parts of 4-(3-hydroxypropyl)piperidine, 8 parts of triethylamine, and 3 parts of sodium iodide in 320 parts of butanone is heated at the boiling point under reflux with agitation for 12 hours. The product is then worked up in accordance with the procedure detailed in Part B of Example 1, excepting that chloroform is substituted for benzene in the described extractions. N-{2-[4 - (3 - hydroxypropyl)piperidino]ethyl} - 2 - chloro - 10-phenothiazinecarboxamide is obtained thus as a brown glass. The product has the formula

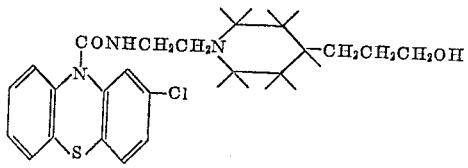

EXAMPLE 5

*N - {2 - [3 - (3 - hydroxypropyl)piperidino]ethyl - 2 - chloro - 10 - phenothiazinecarboxamide*.—Using the procedure of Example 1B, but substituting 15 parts of 3-(3-hydroxypropyl)piperidine for the 4-(hydroxymethyl)piperidine called for therein, there is obtained N-{2-[3-(3-hydroxypropyl)piperidino]ethyl} - 2 - chloro - 10-phenothiazinecarboxamide, of the formula

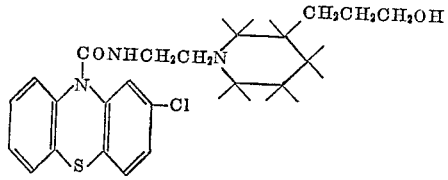

What is claimed is:
1. A compound of the formula

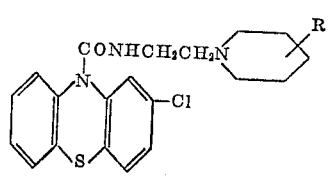

wherein R is a hydroxy(lower alkyl) radical.

2. N - {2 - [4 - (1 - hydroxyethyl)piperidino]ethyl}-2-chloro-10-phenothiazinecarboxamide.

3. N-{2-[4-(2-hydroxyethyl)piperidino]ethyl}-2-chloro-10-phenothiazinecarboxamide.

4. A compound of the formula

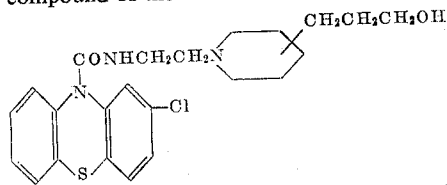

5. N-{2-[4-(3-hydroxypropyl)piperidino]ethyl}-2-chloro-10-phenothiazinecarboxamide.

6. N-{2-[3-(3-hydroxypropyl)piperidino]ethyl}-2-chloro-10-phenothiazinecarboxamide.

7. N-{2-[4-(hydroxymethyl)piperidino]ethyl}-2-chloro-10-phenothiazinecarboxamide.

References Cited in the file of this patent

UNITED STATES PATENTS

| | | |
|---|---|---|
| 2,534,237 | Cusic | Dec. 19, 1950 |
| 2,676,971 | Cusic | Apr. 27, 1954 |
| 2,776,971 | Cusic | Jan. 8, 1957 |
| 2,838,507 | Cusic | June 10, 1958 |
| 2,926,164 | Cusic | Feb. 23, 1960 |

OTHER REFERENCES

Webster's New International Dictionary of the English Language, 2nd Ed., unabridged, page 1090, G and C Merriam Co., Publishers (1939) Springfield, Mass.

Dorland; Am. Illustrated Medical Dictionary (Saunder and Co., Phila.), 1947, 21st. ed. page 621.